US012619587B2

(12) United States Patent
Bergeron et al.

(10) Patent No.: US 12,619,587 B2
(45) Date of Patent: May 5, 2026

(54) SYSTEM FOR RETRIEVAL OF LARGE DATASETS IN CLOUD ENVIRONMENTS

(71) Applicant: MICRO FOCUS LLC, Santa Clara, CA (US)

(72) Inventors: Jean-Philippe Bergeron, Ottawa (CA); Michael John Cyze, Toronto (CA)

(73) Assignee: Micro Focus LLC, Santa Clara, CA (US)

( * ) Notice: Subject to any disclaimer, the term of this patent is extended or adjusted under 35 U.S.C. 154(b) by 131 days.

(21) Appl. No.: 17/775,522

(22) PCT Filed: Feb. 9, 2021

(86) PCT No.: PCT/US2021/017285
§ 371 (c)(1),
(2) Date: May 9, 2022

(87) PCT Pub. No.: WO2022/173423
PCT Pub. Date: Aug. 18, 2022

(65) Prior Publication Data
US 2023/0138113 A1     May 4, 2023

(51) Int. Cl.
*G06F 16/22* (2019.01)
*G06F 7/14* (2006.01)
*G06F 16/245* (2019.01)

(52) U.S. Cl.
CPC ............ *G06F 16/2228* (2019.01); *G06F 7/14* (2013.01); *G06F 16/245* (2019.01)

(58) Field of Classification Search
CPC .... G06F 16/2228; G06F 16/23; G06F 16/245; G06F 16/25
See application file for complete search history.

(56) References Cited

U.S. PATENT DOCUMENTS

| | | | |
|---|---|---|---|
| 6,360,215 B1 * | 3/2002 | Judd | .................... G06F 16/9532 |
| | | | 707/999.009 |
| 7,305,385 B1 * | 12/2007 | Dzikiewicz | ............... G06F 7/02 |
| | | | 707/999.005 |
| 8,638,674 B2 | 1/2014 | Nugent | |
| 9,218,000 B2 | 12/2015 | Mclaughlin | |
| 9,275,129 B2 | 3/2016 | Desai | |
| 10,402,090 B1 | 9/2019 | Tsaur | |
| 2009/0106211 A1 | 4/2009 | Balogh | |

(Continued)

FOREIGN PATENT DOCUMENTS

| | | | |
|---|---|---|---|
| JP | 2006134161 A | * | 5/2006 |
| KR | 20140076010 A | | 6/2014 |

OTHER PUBLICATIONS

Akan, "Parallel Processing in Python with AWS Lambda", Sep. 11, 2017 [retreived on Mar. 8, 2024], Amazon, Retrieved from the Internet: < URL: https://aws.amazon.com/blogs/compute/parallel-processing-in-python-with-aws-lambda/> (Year: 2017).*

(Continued)

*Primary Examiner* — James E Richardson
(74) *Attorney, Agent, or Firm* — Sheridan Ross P.C.

(57) ABSTRACT
A system and method are provided that store electronic data describing events that have occurred in a computing system, index the electronic data to create indexed data records; and store the indexed data records in computer memory as part of a flat data structure.

17 Claims, 6 Drawing Sheets

(56)         References Cited

U.S. PATENT DOCUMENTS

| | | | |
|---|---|---|---|
| 2009/0187564 A1 | 7/2009 | Hajela | |
| 2011/0231899 A1 | 9/2011 | Pulier | |
| 2011/0320498 A1* | 12/2011 | Flor | G06F 16/28 |
| | | | 707/E17.087 |
| 2013/0110839 A1* | 5/2013 | Kirshenbaum | G06F 16/35 |
| | | | 707/E17.014 |
| 2014/0297261 A1 | 10/2014 | Sayers | |
| 2015/0186519 A1* | 7/2015 | Popov | G06F 16/953 |
| | | | 707/723 |
| 2015/0227624 A1* | 8/2015 | Busch | G06F 16/951 |
| | | | 707/728 |
| 2015/0254555 A1* | 9/2015 | Williams, Jr. | G06N 3/045 |
| | | | 706/14 |
| 2016/0224660 A1 | 8/2016 | Munk | |
| 2016/0299934 A1* | 10/2016 | Karandikar | G06F 16/248 |
| 2018/0052819 A1* | 2/2018 | Primavesi | G06F 40/289 |
| 2018/0276269 A1* | 9/2018 | Rasscevskis | G06F 16/1865 |
| 2023/0353595 A1* | 11/2023 | Hu | H04L 63/0236 |

OTHER PUBLICATIONS

Siddiqui, "Parallel Processing: Optimizing AWS Lambda", Aug. 9, 2020 [retrieved on Mar. 8, 2024], LinkedIn, Retrieved from the Internet :< URL: https://www.linkedin.com/pulse/parallel-processing-optimizing-aws-lambda-ghaani-siddiqui> (Year: 2020).*

International Search Report / Written Opinion; PCT/US2021/017285; Mailed Nov. 1, 2021; 11 pages.

* cited by examiner

500 — Receive and Write Incoming Data Describing Events to Raw Events Container

504 — Convert Data Describing Events to Equivalent N-Gram(s)

508 — Encode Each N-Gram to Corresponding Set of Integer Value

512 — Create Shard for Set(s) of Integer Value(s) Corresponding to Subset of Events 516 — Merge Indexed Event Data Records 520 — Await Next Incoming Event(s)

600

Receive Database Search Query

604

Convert Database Search Query into N-Gram(s)

608

Encode Each N-Gram in Database Search Query to Corresponding Set of Integer Value

612

Using Merged Index Data Records, Determine Document IDs for Each Set of Integer Value in Database Search Query

616

Merge Document IDs for Each N-Gram in Database Search Query

620

Provide Search Results to User

SYSTEM FOR RETRIEVAL OF LARGE DATASETS IN CLOUD ENVIRONMENTS

CROSS REFERENCE TO RELATED APPLICATIONS

This application is a national stage application under 35 U.S.C. 371 and claims the benefit of PCT Application No. PCT/US2021/017285 having an international filing date of 9 Feb. 2021, which designated the United States, the entire disclosures of each of which are incorporated herein by reference.

FIELD

The disclosure relates generally to database management and particularly to cloud storage and retrieval of large datasets.

BACKGROUND

Cloud-based computing systems, such as Amazon Web Services (AWS)™ Microsoft Azure™ or Google Compute Platform (GCP)™, are cloud providers that provide "serverless" dynamic management and allocation of machine resources and are an increasingly important deployment model for the development of cloud-based and software-as-a-service (SaaS) applications. Serverless platforms offer functionality that is not available in traditional deployment platforms, such as unlimited and inexpensive, but high latency, storage systems (e.g. AWS's S3™, GCP's Cloud Storage™, and Azure's Azure Storage™) and highly parallelizable, short-term computing capabilities (e.g. AWS's Lambda™, GCP's Cloud Functions™, and Azure's Azure Functions™).

SUMMARY

These and other needs are addressed by the various embodiments and configurations of the present disclosure.

A method is provided that can include the steps:

storing electronic data describing events that have occurred in a computing system;

indexing the electronic data to create indexed data records; and store the indexed data records in computer memory as part of a flat data structure.

A database management system is provided that can include a network interface to send and receive communications, a microprocessor in communication with the network interface, and a computer readable medium coupled with the microprocessor and comprising one or more sets of instructions. When the instructions are executed by the microprocessor, the microprocessor can:

store electronic data describing events that have occurred in a computing system;

index the electronic data to create indexed data records; and store the indexed data records in computer memory as part of a flat data structure.

A database management system is provided that can include a network interface to send and receive communications, a microprocessor in communication with the network interface, and a computer readable medium coupled with the microprocessor and comprising one or more sets of instructions. When the instructions are executed by the microprocessor, the microprocessor can:

receive a database search query comprising a query term that occurs in electronic data describing events that have occurred in a computing system;

convert the query term into an equivalent n-gram;

search indexed data records configured as a flat data structure for electronic data matching the equivalent n-gram; and provide the matching electronic data to a user.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
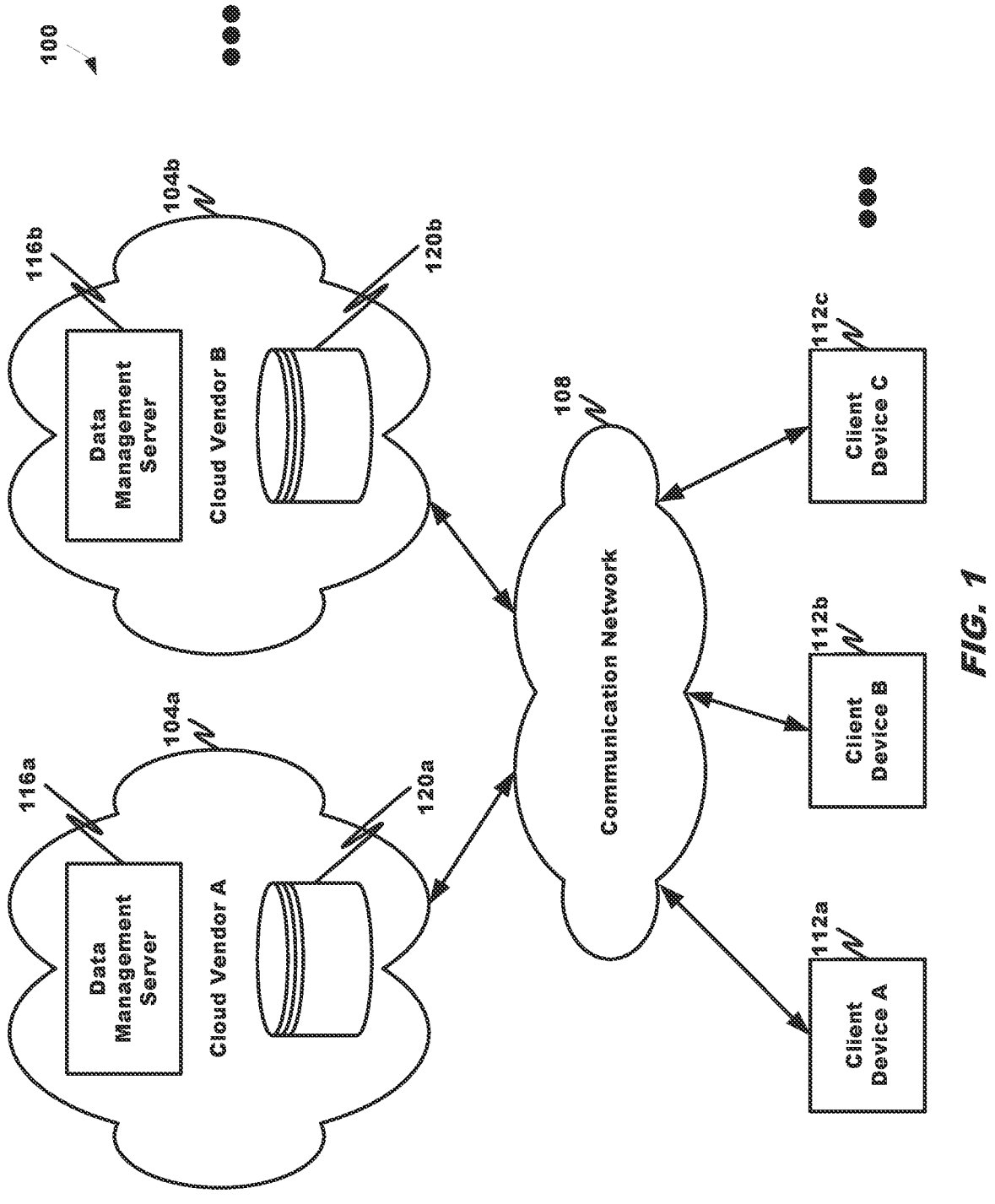
FIG. 1 is a block diagram of a cloud-based system according to embodiments of this disclosure.

The system and method of the present disclosure can address a number of technical problems. A common goal for data lakes is to store a massive amount of information at a small cost and allow for quick data retrieval. For cloud-based data lakes, storing massive amounts of data on cloud storage platforms, like S3™, is relatively inexpensive, but due to the high latencies, typical data retrieval times may be too slow for certain purposes, such as highly interactive user interfaces or real-time analytics systems. The typical way to retrieve data from a cloud-based data lake is to partition data and store it in a columnar form, such as Apache Parquet™, and then search through all data at query time. This can allow for a very cheap storage of large amount of data but also can incur a large time delay during search, and is not fast enough to power a user interface.

In addition, for many use cases, the most important type of a query is a "String Contains" or substring match operation, where one is looking for a substring matches, among a large volume of strings. For example, in Information Technology ("IT") operations one may want to retrieve all recorded IT log events over the past month that involve a device name that contains "Cisco"; or in the security operations center, one may want to retrieve all recorded process loads of "wininet.dll" for all computers in a company within the last 24 hours.

Performing these types of queries using traditional approaches typically relies on a database with a tree-based index structure, where the main challenge would be to retrieve small amounts of data quickly as those file systems have a large latency. By way of illustration, in a tree structure on data, to access a set of data in a downstream node the database management system must first visit multiple upstream nodes and wait for the content of a first (upstream) node before visiting a second (downstream) one. In a large database with billions of rows, a O(log n) query might visit 32 nodes and take more than 3 seconds on such a system, as the database management system would need to visit all nodes sequentially and wait for the 100 ms delay 32 times. This example illustrates a "best case" scenario with a query which matches an index pattern. With a query that looks for a sub-string match, no index could be used and the entire index would have to be read, resulting in even longer search times.

While various solutions have been proposed to address these technical problems, they suffer variously from slow response times (for example due to a large index, reading a partitioned data set for each search query, a lack of a substring index for sub-string matches, etc.), complexity (e.g., the need to specify a machine need), high processing resource demands (e.g., the need to maintain a persistent cluster), and high expense associated with data storage and/or retrieval.

The technical solution of the present disclosure stores electronic data describing events that have occurred in a computing system; indexes the electronic data to create indexed data records; optionally merges the indexed data records to create merged indexed data records; and stores the merged indexed data records in computer memory as part of a flat data structure. The flat file structure can have a uniform format without structures for indexing or recognizing relationships between records.

The technical solution of this disclosure can provide an indexing structure that provides target response time of within 2 seconds, despite potentially handling billions of rows and terabytes of data. The system commonly compromises where queries are not slow but the efficiency is worth a reasonable cost. The system can enable efficient/cost-effective searches for certain types of queries (e.g., "String Contains" or similarly structured search queries). The system can use serverless technologies like AWS Lambda™ and AWS S3™ that are not available on traditional deployments. The system can provide significant cost savings relative to current approaches, whether using a volume-based or data type-based pricing model. Although the description that follows will use AWS terminology, it is to be understood by one of ordinary skill in the art that this system can be developed on other cloud platforms such as Azure™ or GCP™ by using the equivalent capabilities.

FIG. 1 depicts an embodiment of the database management system 100 according to the disclosure. With reference to FIG. 1, the system 100 includes plural cloud service vendors 104a, b, . . . connected by network 108 to the client devices A, B, C, . . . 112a, b, c, . . . .

The cloud service vendors 104a, b, . . . can be public, private, hybrid, or multi-clouds managed by cloud computing vendors and service providers that include one or more of server(s), database(s) and other storage, network(s), software, analytics and artificial intelligence to provide computing services to client devices A, B, C, . . . 112a, b, c, . . . . Examples of cloud service vendors 104a, b, . . . include Infrastructure-as-a-service ("IaaS"), Platform-as-a-service ("PaaS"), serverless computing, Function-as-a-service ("FaaS"), Mobile-Backend-as-a-service ("MBaaS"), Database-as-a-service ("DBaaS"), and Software-as-a-service ("SaaS") that provide services such as providing cloud-native applications, data storage and retrieval, audio and video streaming, software delivery on demand, data analysis, and the like. The cloud computing resources can be abstracted from physical hardware, such as by virtualization technology.

In one embodiment, the cloud serviced vendors 104a, b, . . . each include a data management server 116a, b, . . . and an associated database 120a, b, . . . to provide cloud storage. The virtual storage space provided by the cloud service vendors 104a, b, . . . can be pooled together into a data lake or swamp that users can access as a single repository to provide cloud storage. Cloud storage can have any format, such as block storage, object storage, or file storage depending on the application, and be in the form of public cloud storage, private cloud storage, or hybrid cloud storage.

The data management server 116a, b, . . . interacts with client devices A, B, C, . . . , applications, and the database(s) 120a, b, . . . to capture, analyze, store, and retrieve data. The data management server 116a, b, . . . , as discussed in detail below, processes incoming or raw events, indexes electronic data describing the events to form indexed data records, merges the indexed data records to form merged indexed data records, and handles database search queries.

The database 120a, b, . . . can be configured in accordance with any type of database, such as object-oriented, relational, distributed, hierarchical, network, and others, use any compatible database language, such as an SQL, NoSQL, or NewSQL, and store any type of event data. In one configuration, the event data is digital data generated by a computer monitoring system.

The client devices A, B, C, . . . 112a, b, c, . . . can be any computational device, such as a personal, tablet, or laptop computer, personal digital assistant, smart phone, mainframe computer, or other computer device or system.

The communication network 128, in some embodiments, can be any trusted or untrusted computer network, such as a WAN or LAN. The Internet is an example of an untrusted communication network 128 that constitutes an IP network consisting of many computers, computing networks, and other communication devices located all over the world. Other examples of the communication network 128 include, without limitation, an Integrated Services Digital Network (ISDN), the Public Switched Telephone Network (PSTN), a cellular network, and any other type of packet-switched or circuit-switched network known in the art. In some embodiments, the communication network 128 may be administered by a Mobile Network Operator (MNO). It should be appreciated that the communication network 128 need not be limited to any one network type, and instead may be comprised of a number of different networks and/or network types. Moreover, the communication network 128 may comprise a number of different communication media such as coaxial cable, copper cable/wire, fiber-optic cable, antennas for transmitting/receiving wireless messages, wireless access points, routers, and combinations thereof. The communication network 108 is typically the Internet ("the cloud").

Figure 2:
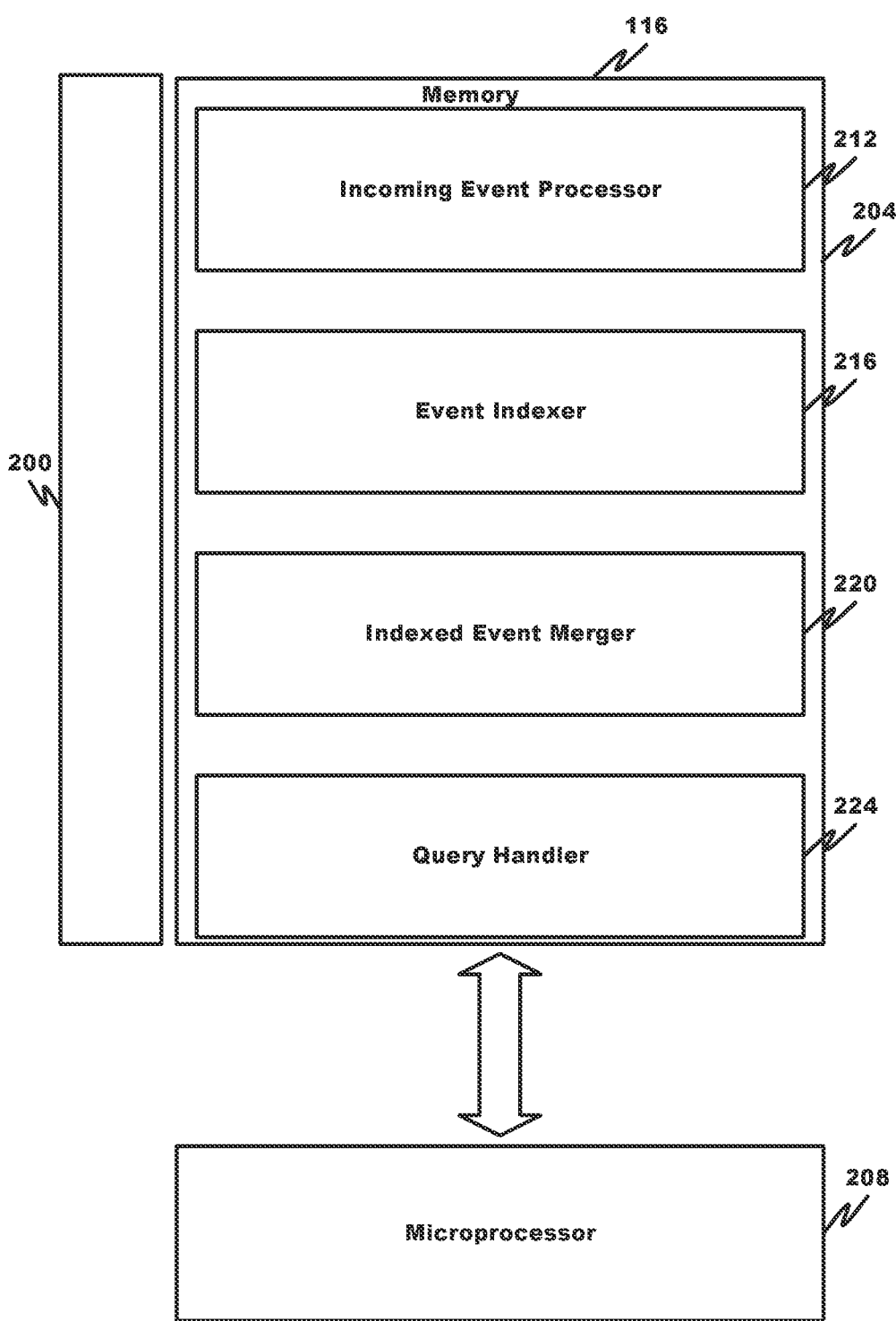
FIG. 2 is a block diagram of a data management server according to an embodiment of this disclosure.

Referring to FIG. 2, the data management server 116a, b, . . . will be discussed. The data management server 116a, b, . . . includes one or more communication interfaces 200 and memory 204 coupled to a microprocessor 208.

The one or more communication interfaces 200 may provide the data management server 116a, b, . . . with the ability to send and receive communication packets (e.g., requests) or the like over the communication network 128. The one or more communication interfaces 200 may be provided as a network interface card (NIC), a network port, drivers for the same, and the like. Communications between the components of the data management server 116a, b, . . . and other devices connected to the communication network 128 may all flow through the one or more communication interfaces 200. In some embodiments, the one or more communication interfaces 200 may be provided in a single physical component or set of components, but may correspond to different communication channels (e.g., software-defined channels, frequency-defined channels, amplitude-defined channels, etc.) that are used to send/receive different communications to other components.

The microprocessor(s) 208 can correspond to one or many computer processing devices. For instance, the microprocessor(s) 208 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the microprocessor(s) 208 may be provided as a microcontroller, microprocessor, Central Processing Unit (CPU), or plurality of microprocessors that are configured to execute the instructions sets stored in memory 204. Upon executing the instruction sets stored in memory 204, the microprocessor(s) 208 enable various database management functions.

The memory 204 may include any type of computer memory device or collection of computer memory devices. The memory 204 may include volatile and/or nonvolatile memory devices. Non-limiting examples of memory 204 include Random Access Memory (RAM), Read Only Memory (ROM), flash memory, Electronically-Erasable Programmable ROM (EEPROM), Dynamic RAM (DRAM), etc. The memory 204 may be configured to store the instruction sets depicted in addition to temporarily storing data for the microprocessor(s) 208 to execute various types of routines or functions.

The illustrative instruction sets that may be stored in memory 204 include, without limitation, an incoming event processor 212, event indexer 216, indexed event merger 220, and query handler 224. Functions of the data management server 116a, b, . . . enabled by these various instruction sets are described below. Although not depicted, the memory 204 may include instructions that enable the microprocessor(s) 208 to store data into and retrieve data from the associated database 120a, b, . . . . It should be appreciated that the instruction sets depicted in FIG. 2 may be combined (partially or completely) with other instruction sets or may be further separated into additional and different instruction sets, depending upon configuration preferences for the data management server 116a, b, . . . . Said another way, the particular instruction sets depicted in FIG. 2 should not be construed as limiting embodiments described herein.

In some embodiments, the instructions for the incoming event processor 212, when executed by microprocessor(s), may enable the data management server 116a, b, . . . to continuously write the incoming or raw electronic data describing events from various sources, such as endpoints or analytics, to the associated database 120a, b, . . . (e.g., in a container such as an S3™ raw events bucket). The source of the incoming electronic data describing the events is independent from the database implementation. Writing electronic data describing the events is not slowed in any way by the database implementation, the incoming electronic data can be written at any pace, and, for example, are immediately considered durable as per S3 durability. At any time, the database can come back to the original events in the container.

In some embodiments, the instructions for the event indexer 216, when executed by microprocessor(s), may enable the data management server 116a, b, . . . to index the electronic data describing events to create indexed data records. Indexing of incoming electronic data describing events can include determining, for each electronic data describing an event, a number of n-grams (e.g., tri-grams) that are represented within a first electronic data, assigning a document identifier associated with the first electronic data and correlating the document identifier with each of the number of n-grams that are represented within the first electronic data.

In some embodiments, the instructions for the indexed event merger 220, when executed by microprocessor(s), may enable the data management server 116a, b, . . . to merge the indexed data records to create merged indexed data records and store the merged indexed data records in computer memory as part of a flat data structure. The document identifiers and associated n-grams in the flat data structure correlate the n-grams to the document identifiers. In the flat data structure, the n-grams can be encoded as sets of integer values. The flat data structure can be searchable immediately after having the merged indexed data records stored therein.

As new incoming events are received, the event indexer 216 and indexed event merger 220, when executed by the microprocessor(s), collectively discover the new electronic data describing a new event in the computing system, in response to discovering the new electronic data, index the new electronic data to create a new indexed data record, optionally merge the new indexed data record with the merged indexed data records, and store the new indexed data record in the computer memory as part of the flat data structure.

In some embodiments, the instructions for the database query handler 224, when executed by microprocessor(s), may enable the data management server 116a, b, . . . to receive from a client device A, B, C, . . . 112a, b, c, . . . a database query (e.g., a string query) that comprises a query term, search the flat data structure for a match between the query term and an n-gram stored in the flat data structure, and return a document identifier associated with the match between the query term and the n-gram stored in the flat data structure. The query handler 224 instructions, when executed by the microprocessor(s), may enable the data management server 116a, b, . . . to receive a second database query that comprises a second query term, search the flat data structure for a match between the second query term and another n-gram stored in the flat data structure, wherein the flat data structure can be searched for the second query term in parallel with being searched for the query term, and return a second document identifier associated with the match between the second query term and the other n-gram stored in the flat data structure.

An exemplary implementation of the data management server 116 will be discussed with reference to FIG. 3. Although FIG. 3 uses AWS terminology, it is to be understood by one of ordinary skill in the art that this system can be developed on other cloud platforms such as Azure™ or GCP™ by using the equivalent capabilities. The illustrative implementation is described with reference to phases, but it should be noted that all "phases" can be performed in parallel. Finally, the disclosure is discussed with reference to "shards". As will be appreciated, a "database shard" or a "shard" is a, typically horizontal, partition of data in a database or search engine. The concept of shards discussed below is different than the concept of shards in most databases, as the compute is not tied to the storage, one node could query one shard or one thousand, depending on the processing power of that node. In the disclosure, the data and index do not move, various shards are queried by the data management server 116 depending on the time range of the initial query.

In an ingest phase, the data management server 116, while executing the incoming event processor 212 instructions, receives (raw) electronic data describing events 300 and continuously writes the electronic data to an S3 bucket 304 in the associated database containing electronic data describing events 300. As will be appreciated, an Amazon™ S3 Bucket™ is a public cloud storage resource available in Amazon Web Services' (AWS)™ Simple Storage Service (S3)™, an object storage offering. 53 buckets, which are similar to file folders, store objects, which include data and its descriptive metadata.

In an indexing phase, the data management server 116, while executing the incoming event processor 212 instructions, retrieves a selected item 308 of electronic data describing an event from the S3 bucket 304, provides the selected item 308 of electronic data to a parallel lambda compute process 312 to provide a set of indexed incoming events 316 to be stored in the S3 bucket 304. As will be appreciated, a lambda compute process 312 refers to processing by AWS Lambda™, which is a is an event-driven, serverless platform provided by Amazon™ as a part of AWS™. It is a computing service that runs code in response to events and automatically manages the computing resources required by that code. As shown in FIG. 3, the lambda compute process 312 runs in parallel on multiple processing resources.

By way of illustration, the data management server 116, in response to the database noticing a new unindexed file in the S3 bucket 304, commences the process of indexing to produce an indexed data record 316 comprising encoded electronic data (e.g., integer value equivalent corresponding to selected n-gram) and corresponding document IDs. The indexing process can comprise writing lists of document identifiers (IDs) and associated n-grams.

The document IDs are unique to a shard, but not globally unique. Inside of a selected shard, the document IDs are sequentially numbered/labeled 0, 1, 2 etc. In addition to the document ID, one shard contains the file offset positions, which map the document ID to the byte offset of the record in the original file. The goal of the indexing phase is to create a small index which can immediately be queried from searches. The challenge comes from the fact that the source files are of variable sizes. Considering that the target index size is 512 MB, there are generally two different options. In the first option applicable to large input files, the original files are split into shards to allow for parallel processing. In this option, the data management server 116 finds byte offsets in the original file every 512 MB, and then skips to the next record to account for the case where the byte offset is in the middle of a record. Assuming for instance an input file of 1500 MB, the data management server 116 would create three shards, 0-512 MB, 512-1024 MB, 1024-1500 MB and send those three work items to three lambda processes 312. In the second option, applicable to input files smaller than the target 512 MB shard size, the indexing algorithm can also merge files together. Making the document IDs sequential, between files. In the index phase, the data management server 116 attempts to write small shards to allow them to be searchable soon after being written to the S3 bucket 304, and the entire shard is kept in memory as it is being computed. Depending on the application, a 512 MB-1024 GB shard has been found to be an optimal size for a 3 GB lambda process.

To encode selected electronic data, the data management server 116 divides the electronic data into multiple n-gram subparts and converts each n-gram subpart into a corresponding set of integer values and not as a string. For example, for selected electronic data "abcde", the data management server 116 creates three trigrams, namely "abc", "bcd" and "cde". The trigram "abc" is then converted into and stored in its American Standard Code for Information Interchange ("ASCII") equivalent, namely 0x636261. As will be appreciated, ASCII is a character encoding standard for electronic communication. Other character encoding standards may be used, such as the Unicode, ISO 8859, MS-Windows™ character sets, MIK, ISCII, TSCII, VISCII, or GB18030 standard.

The data management server 116, in the merge phase, retrieves a selected indexed data record 316 comprising the encoded electronic data describing an event and corresponding document ID(s) from the S3 bucket 304, provides the selected indexed data record 316 to a parallel lambda compute process 320 to provide a merged indexed data structure 324 comprising the various indexed data records 316 record to be stored in the S3 bucket 304. The merged indexed data records 324 are typically in the form of a flat table or other flat data structure, with the corresponding sets of integer values of the n-grams being stored linearly.

Figure 4:
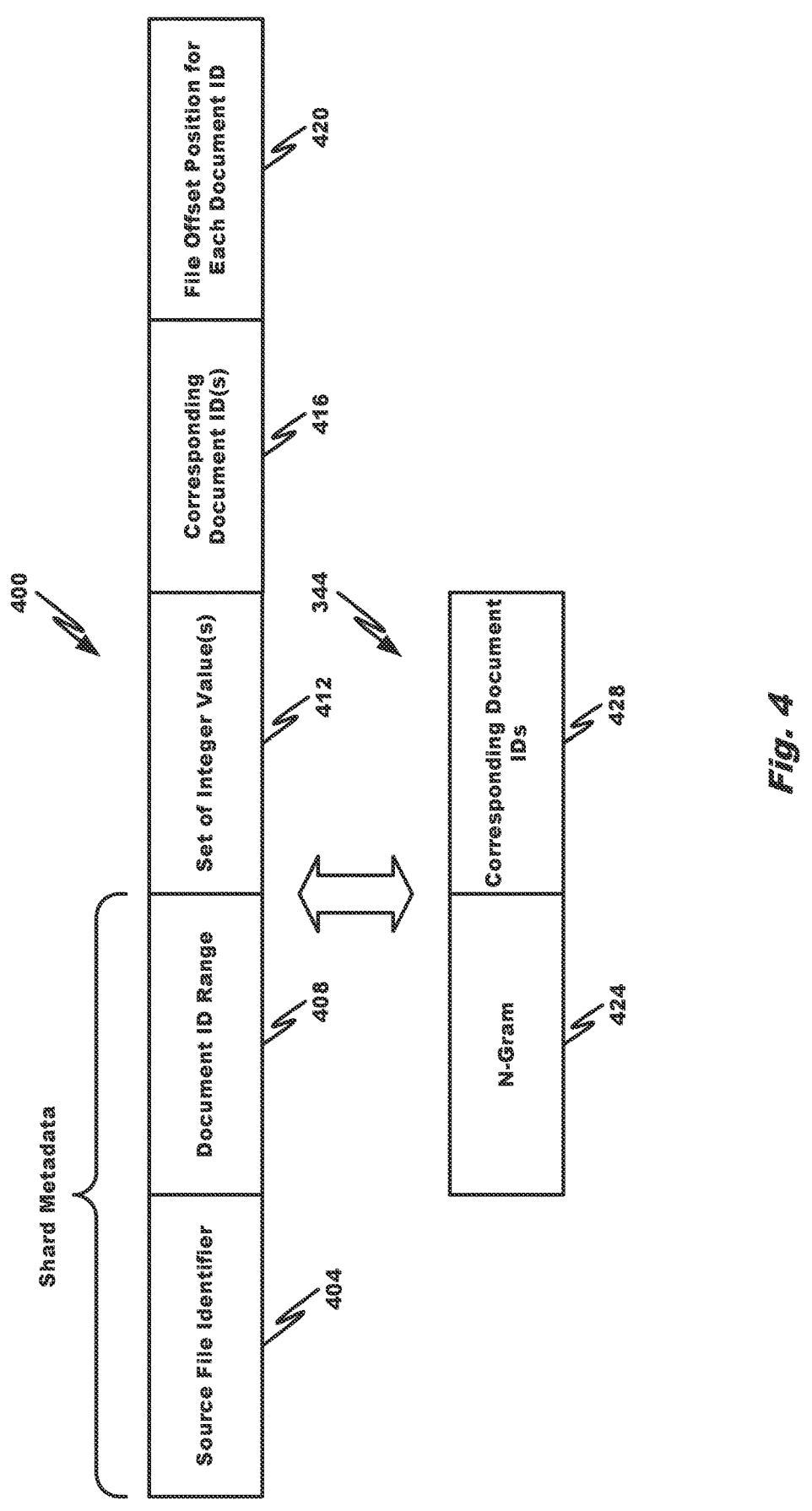
FIG. 4 depicts various data structures according to an embodiment of the present disclosure.

FIG. 4 depicts a set of merged indexed data records according to an embodiment of the disclosure. The merged indexed data records 400 correspond to a shard containing the source electronic data describing event(s). The merged indexed data records 400 comprise the following fields: a source file identifier 404, document ID range 408 of the corresponding shard (e.g., 0, 1, 2, c, etc.), set of integer value(s) 412 corresponding to each set of n-grams (e.g., "abc", "abd", "bcd", "cde", "def", etc.), a corresponding document ID in the shard containing each of the n-grams 416, and a file offset position in the shard for each document ID 420. The source file identifier 404 and document ID range 408 are commonly in shard metadata and contain the identification or location (e.g., storage address) of the respective electronic data describing event(s) (e.g., in the S3 bucket 304) and the document ID range for the document IDs in the corresponding document ID field 416. The file offset position for each document ID field 420 comprises the file offset positions, which map the document ID to the byte offset of the record in the original source file containing the electronic data describing event(s).

The corresponding document ID field 416 can comprise multiple document IDs for a selected set of integer value(s). During the index process, the data management server 116 creates a long list of document IDs for each n-gram. By way of illustration for the electronic data "abcdef", an example of the set of integer value(s) and corresponding document IDs fields 412 and 416 is shown below:

| Set of Integer Value(s) (expressed in n-gram character equivalent) | Document IDs |
| --- | --- |
| abc | 0 |
| abd | 2 |
| bcd | 0 |

-continued

| Set of Integer Value(s) (expressed in n-gram character equivalent) | Document IDs |
| --- | --- |
| cde | 0, 1 |
| def | 1 |

The n-grams can be sorted alphabetically to allow for merging multiple shards later. To allow for parallel requests to S3, the data management server 116 can avoid using the typical tree structures that databases use. Additionally, n-gram algorithms enable the client device to search for partial matches.

In one implementation, the document IDs are stored as a delta compressed list as the document IDs are an increasing array of values. For instance, if the document IDs are 1, 2, 3, and 5 the stored document ID list could be 1, 1, 1, 2, or the differences between numerically adjacent document ID values. In one implementation, the document ID can be further compressed by storing the difference between these delta values, which would be "0" for the first three delta values and "1" for the difference between the last delta values in the string. The compressed storage would be three zeros and a 1 to provide further storage space savings in the merged indexed data records.

As will be appreciated, the data structures 400 can include other fields, such as a timestamp field containing timestamps corresponding to the event from which each n-gram is parsed.

Returning to FIG. 3 in a search phase, the data management server 116 provides the user 328 at the client device 112 with a display 332 of information associated with the incoming events. For example, the display can be a portion of the information itself, a summary of the information, and the like. It can also be a display comprising a database search query field to enable the user to input a set of terms to be searched. In terms of traditional SQL database queries, an exemplary search query supported by the disclosure is a string contains query that take the following form:

> SELECT*FROM database WHERE column LIKE '% some text %' AND
> other column NOT LIKE '% other text %' ORDER BY time ASC The techniques of this disclosure can also allow for query faceting by pre-computing groups. In these applications, there are no data aggregations other than faceting. The techniques of this disclosure can support other types of search queries, such as a typeahead search.

A Node.js coordinator 336 of the data management server 116 receives the database search query and provides the search query to multiple parallel lambda search processes 340. As will be appreciated, "Node.js" is an open-source, cross-platform, backend JavaScript runtime environment that executes JavaScript code outside a web browser. In one application, the search query corresponds to multiple different n-grams, and one n-gram is provided to each lambda search process 340. The lambda search processes 340 output a set of search results 344 and forwards the search results to the client device 112 of the user.

With reference to FIG. 4, the set of search results 344 comprise an n-gram field 424 containing the n-grams in the database search query and the corresponding document IDs 428 (typically listed in sequential order). The data management server 116 maps, by document ID and shard metadata, each of the n-grams in the search results to the stored electronic data describing events and provides the user with the corresponding electronic data.

To exemplify the search phase, if one wanted to query for "cdef", he or she would take the list of documents for "cde" [0,1] and create an union with the list of documents for "def" [1] and obtain the result [1]. It is possible to return more matches than requested as the data management server 116 does not store the location of the n-gram in the original string; however, it is not possible to miss a match. The data management server 116 performs a post-processing step to remove the extra rows returned. In practice, n-gram match errors are very rare.

Figure 3:
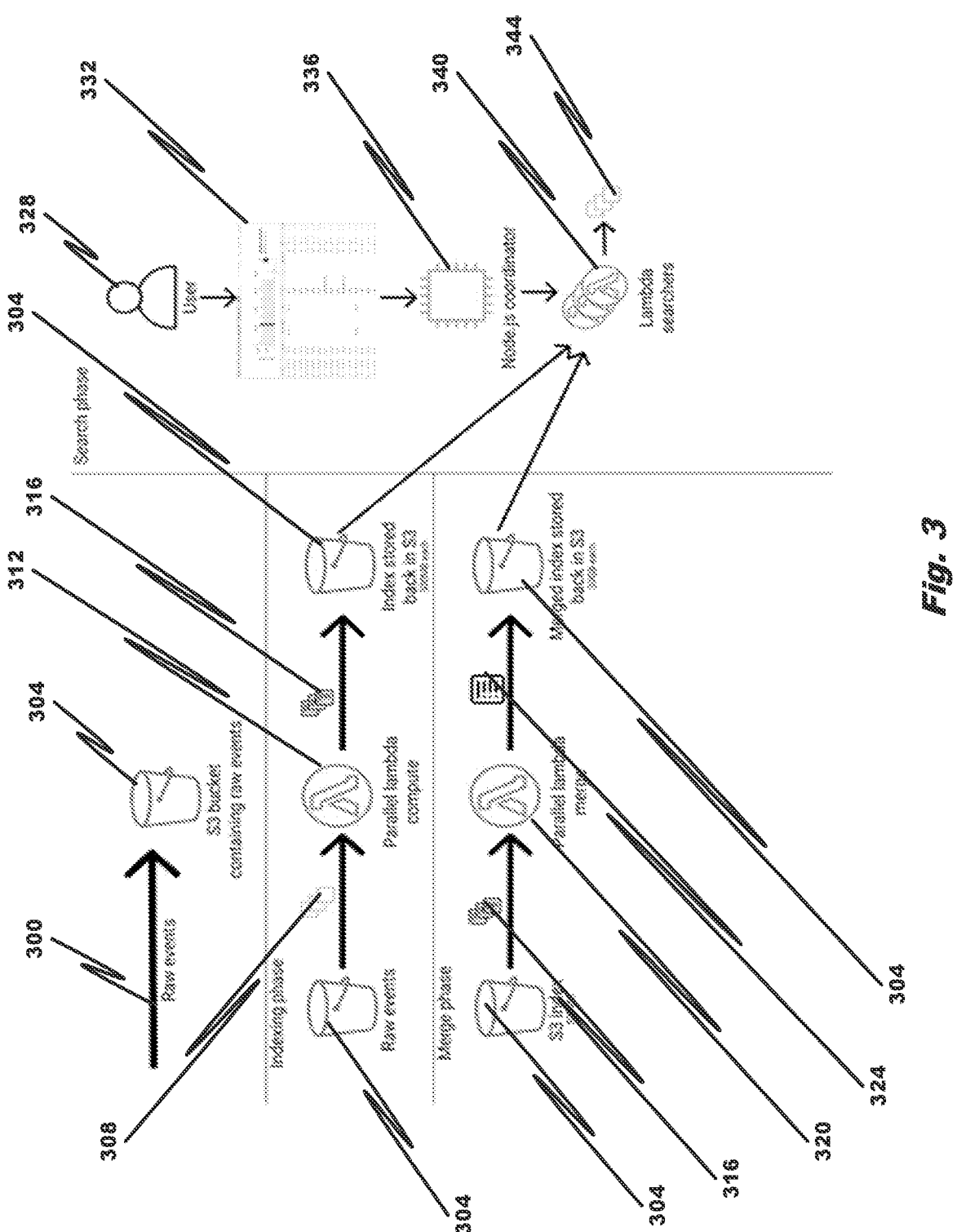
FIG. 3 depicts an embodiment of a data management and retrieval process flow according to an embodiment of the present disclosure.

While lambda processes are disclosed in the example of FIG. 3, it is to be understood that any vectorized code may be employed. In particular, vectorization of document IDs comparison in the search phase can be high advantageous to provide quicker search times.

Figure 5:
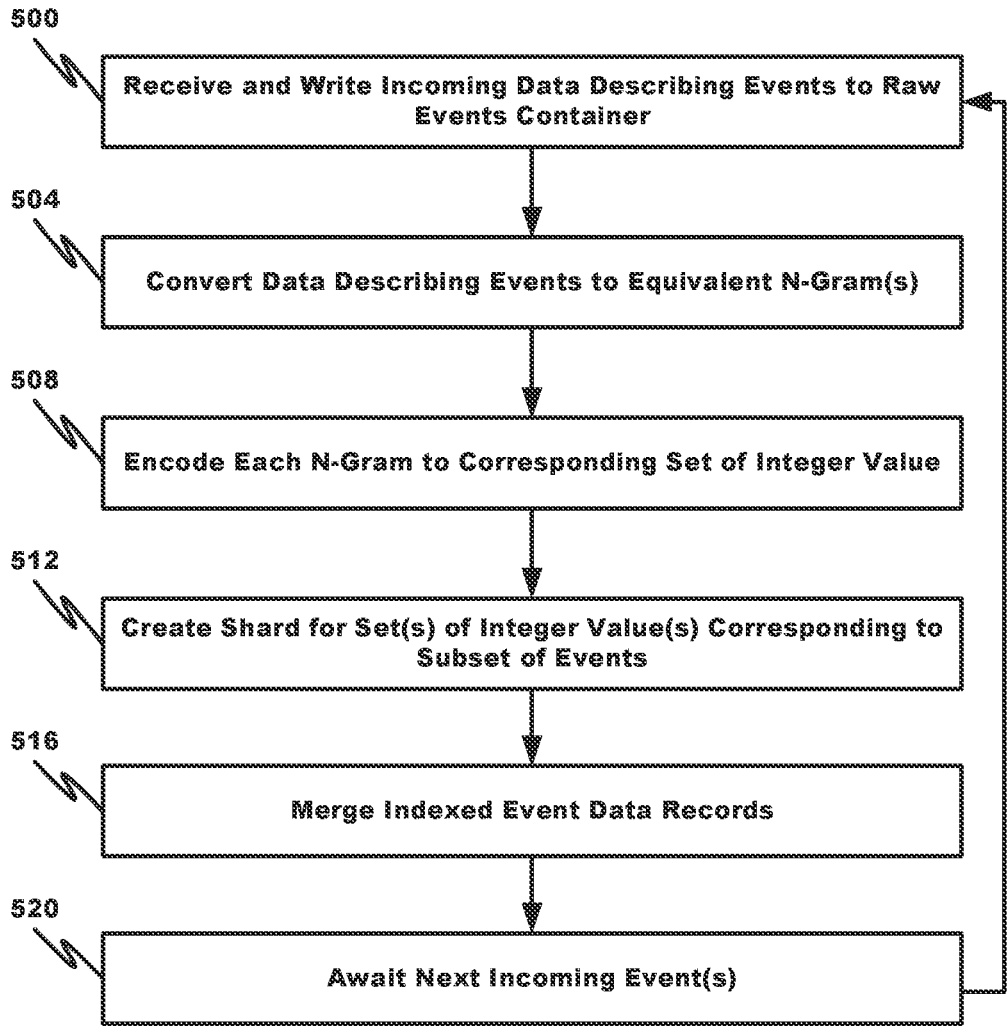
FIG. 5 depicts a data management process flow according to an embodiment of the present disclosure.

With reference to FIG. 5, the ingest, index, and merge phases will be discussed in connection with process flows according to an embodiment.

In step 500, the microprocessor 208, while executing instructions corresponding to the incoming event processor 212, receives and writes continuously incoming or raw electronic data describing events to a container, such as S3 bucket 304.

In step 504, the microprocessor 208, while executing instructions corresponding to the event indexer 216, retrieves the stored electronic data describing events from the raw events container and converts the data for each event into equivalent n-grams and generates a corresponding document ID for each n-gram.

In step 508, the microprocessor 208, while executing instructions corresponding to the event indexer 216, forms an indexed data record stored in the container by encoding each n-gram into a corresponding set of integer values and, in step 512, creating a shard to index the document IDs and respective sets of integer values. As noted, one shard contains the file offset positions, which map the document ID to the byte offset of the electronic data in the source file.

In step 516, the microprocessor 208, while executing instructions corresponding to the indexed event merger 220, merges the indexed data records into the merged index data records 304, which is stored in the container.

In step 516, the microprocessor 208, while executing instructions corresponding to the incoming event processor 212, awaits a next incoming event(s).

Figure 6:
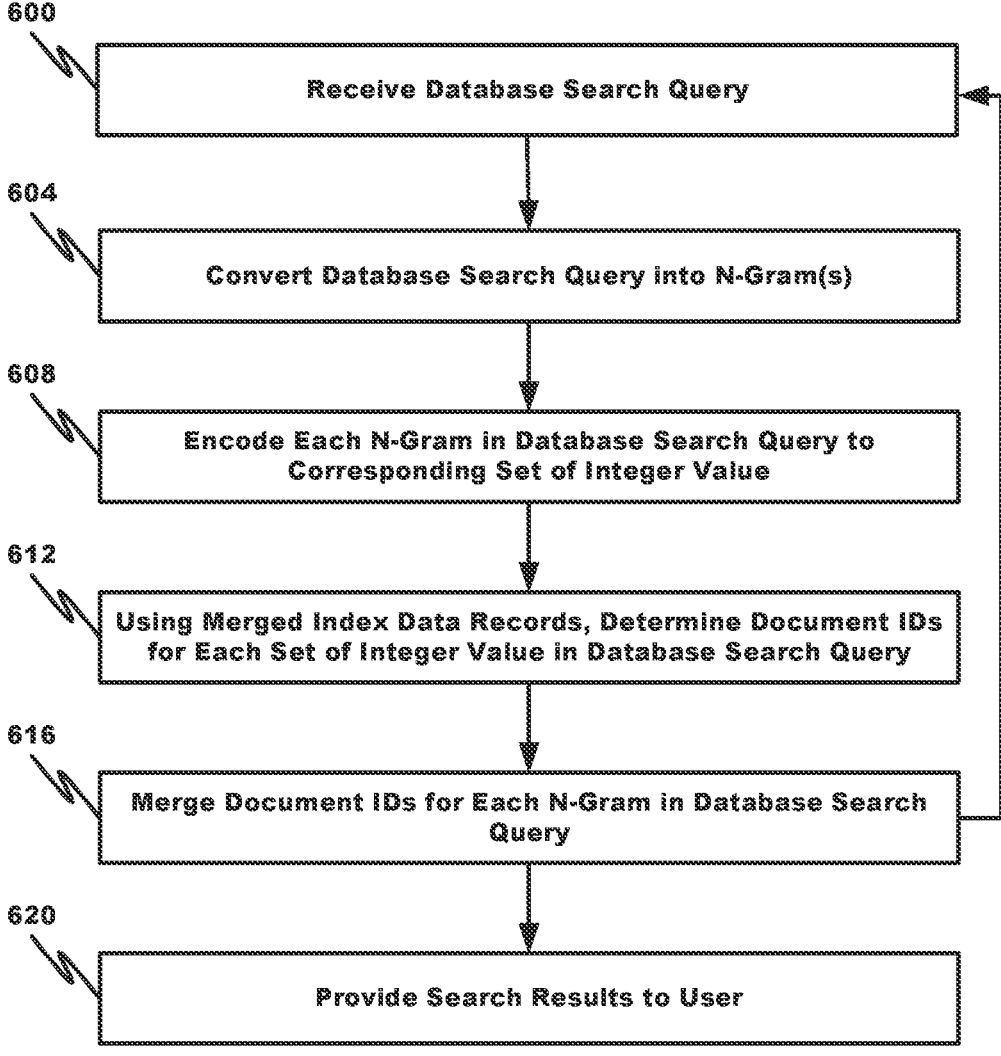
FIG. 6 depicts a data retrieval process flow according to an embodiment of the present invention.

With reference to FIG. 6, the search phase will be discussed in connection with process flows according to an embodiment.

In step 600, the microprocessor 208, while executing instructions corresponding to the query handler 224, receives from the user and processes a database search query.

In steps 604 and 608, the microprocessor 208, while executing instructions corresponding to the query handler 224, converts a query term in the database search query into equivalent n-gram(s) and encodes each n-gram to a corresponding set of integer values. Because n-gram encoding is employed, the search terms can be any set of characters, whether alphabetical, numerical, alphanumerical, and the like. As will be appreciated in database management, when a user enters an instruction in SQL language, for example, the command in the high-level language instruction is parsed and translated to a low-level language that the underlying machine can understand and process to perform the appropriate database functionality.

In step 612, the microprocessor 208, while executing instructions corresponding to the query handler 224, using the merged index data records determines the document IDs for each set of integer values in the search query.

In step 620, the microprocessor 208, while executing instructions corresponding to the query handler 224, merges the document IDs for each selected n-gram in the database search query to provide a non-repeating list of document IDs for the selected n-gram. Merged search results can then be formed across all the n-grams in the database search query. As will be appreciated, the list of document IDs for all n-grams in each database search query can be filtered by taking the union of all of the lists of document IDs for the n-grams in the search query to provide a more compact listing of non-repeating document IDs.

In step 620, the microprocessor 208, while executing instructions corresponding to the query handler 224, uses the merged list of document IDs for all n-grams in the search query to determine the search results in the source files for presentation to the user.

One of ordinary skill in the art would believe that the n-gram representation of event data would be less efficient than storing the original incoming event data, but this is not the case, particularly when container storage such as S3 is considered. The list of document IDs is an increasing list of integers and is very suitable for integer encoding, such as by a Turbo code (e.g., Turbo Patched Frame of Reference ("TurboPFor")), for encoding the list. The timestamps can also be consistently increasing and are suitable for Gorilla™ encoding. As will be appreciated, Gorilla™ encoding compresses data points within a time series with no additional compression used across time series. Each data point is normally a pair of 64-bit values representing the time stamp and value at that time. Timestamps and values can be compressed separately using information about previous values. The techniques of this disclosure can realize a 90% reduction in storage space, particularly with those algorithms.

While the resulting merged index is typically larger than state of the art databases like Elasticsearch™ by about 50%, it is very suitable for data lakes and swamps where storage is cheap and parallel queries are important (e.g., in the field of threat hunting and security operations). In particular, despite the fact that the storage required is larger than Elasticsearch™, the cost is significantly less because the techniques of this disclosure are able to store the indexes in inexpensive container (e.g., S3) storage rather than expensive, low latency storage required to support Elasticsearch™.

Another benefit of n-gram storage is that every n-gram can be searched for in parallel. With the previous example, the search string "abcd" would issue two parallel calls to S3.

Another advantage is that the techniques of this disclosure do not rely on caching data during the search phase.

It may be possible to index the incoming event data so that on-demand queries can be run. As an example, if one were to query for N days, he or she would launch N machines whereas if one wanted to query for N+M days, he or she would launch N+M machines.

Any of the steps, functions, and operations discussed herein can be performed continuously and automatically.

The following definitions apply to this disclosure.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof refer to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "cloud storage" is a model of computer data storage in which the digital data is stored in logical pools, said to be on "the cloud". The physical storage spans multiple servers (sometimes in multiple locations), and the physical environment is typically owned and managed by a hosting company. These cloud storage providers are responsible for keeping the data available and accessible, and the physical environment protected and running. People and organizations buy or lease storage capacity from the providers to store user, organization, or application data.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The term "data lake" refers to a system or repository of data stored in its natural/raw format, usually object blobs or files. A data lake is usually a single store of data including raw copies of source system data, sensor data, social data etc., and transformed data used for tasks such as reporting, visualization, advanced analytics, and machine learning. A data lake can include structured data from relational databases (rows and columns), semi-structured data (CSV, logs, XML, and JSON), unstructured data (emails, documents, PDFs) and binary data (images, audio, video). A data lake can be established "on premises" (within an organization's data centers) or "in the cloud" (using cloud services from vendors).

A "data swamp" is a deteriorated and unmanaged data lake that is either inaccessible to its intended users or is providing little value.

The terms "determine", "calculate" and "compute," and variations thereof are used interchangeably and include any type of methodology, process, mathematical operation or technique.

A "flat-file" database is a database stored in a file called a flat file. Records follow a uniform format, and there are no structures for indexing or recognizing relationships between records. The file is simple. A flat file can be a plain text file, or a binary file. Relationships can be inferred from the data in the database, but the database format itself does not make those relationships explicit.

The term "means" shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "serverless computing" may refer to a way of deploying code that enables cloud native applications to bring up the code as needed; that is, it can scale it up or down as demand fluctuates and take the code down when not in use. In contrast, conventional applications deploy an ongoing instance of code that sits idle while waiting for requests.

The exemplary systems and methods of this disclosure have been described in relation to database management systems. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

For example in one alternative embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
storing, by a microprocessor, electronic data describing events that have occurred in a computing system;
indexing, by the microprocessor, the electronic data to create indexed data records;
storing, by the microprocessor, the indexed data records in computer memory as part of a flat data structure;
determining, by the microprocessor, for each electronic data, a number of n-grams that are represented within a first electronic data;
assigning, by the microprocessor, a document identifier associated with the first electronic data, wherein document identifiers are unique to a shard corresponding to a subset of the electronic data but not globally unique;
correlating, by the microprocessor, the document identifier with each of the number of n-grams that are represented within the first electronic data; and
storing by the microprocessor, the document identifier in a delta-compressed list storing a plurality of delta-compressed document identifier values, wherein each stored value of each document identifier in the delta-compressed list represents a numerical difference between sequential document identifiers excluding a first document identifier; and
wherein the delta-compressed list is further compressed by storing differences between adjacent delta values.

2. The method of claim 1, further comprising:
merging, by the microprocessor, the indexed data records to create merged indexed data records, the indexed data records being stored as the merged indexed data records;
discovering, by the microprocessor, a new electronic data describing a new event in the computing system;
in response to discovering the new electronic data, indexing, by the microprocessor, the new electronic data to create a new indexed data record;
merging, by the microprocessor, the new indexed data record with the merged indexed data records; and
storing, by the microprocessor, the new indexed data record in the computer memory as part of the flat data structure.

3. The method of claim 1, further comprising:
receiving, by the microprocessor, a database query that comprises a query term;
searching, by the microprocessor, the flat data structure for a match between the query term and an n-gram stored in the flat data structure; and
returning, by the microprocessor, a document identifier associated with the match between the query term and the n-gram stored in the flat data structure.

4. The method of claim 3, wherein the database query comprises a string query, and wherein the n-gram comprises a trigram.

5. The method of claim 3, wherein the flat data structure is stored in a cloud-computing environment and further comprising:
receiving, by the microprocessor, a second database query that comprises a second query term;
searching, by the microprocessor, the flat data structure for a match between the second query term and another n-gram stored in the flat data structure, wherein the flat data structure is searched for the second query term in parallel with being searched for the query term; and returning, by the microprocessor, a second document identifier associated with the match between the second query term and the another n-gram stored in the flat data structure.

6. The method of claim 1, wherein the flat data structure correlates n-grams to document identifiers, and wherein the n-grams are encoded as integer values.

7. The method of claim 1, wherein the electronic data comprises data files received from endpoints in the computing system, and wherein the flat data structure is searchable immediately after having the indexed data records stored therein.

8. A database management system, comprising:

a network interface to send and receive communications;

a microprocessor in communication with the network interface; and a computer readable medium coupled with the microprocessor and comprising one or more sets of instructions that, when executed by the microprocessor, cause the microprocessor to:

store electronic data describing events that have occurred in a computing system;

index the electronic data to create indexed data records;

store the indexed data records in computer memory as part of a flat data structure;

determine, for each electronic data, a number of n-grams that are represented within a first electronic data;

assign a document identifier associated with the first electronic data, wherein document identifiers are unique to a shard corresponding to a subset of the electronic data but not globally unique;

correlate the document identifier with each of the number of n-grams that are represented within the first electronic data;

store the document identifier in a delta-compressed list storing a plurality of delta-compressed document identifier values, wherein each stored value of the document identifiers in the delta-compressed list represents a numerical difference between sequential document identifiers excluding a first document identifier; and wherein the delta-compressed list is further compressed by storing differences between adjacent delta values.

9. The database management system of claim 8, wherein the microprocessor, when executing the one or more sets of instructions, further:

merges the indexed data records to create merged indexed data records, the indexed data records being stored as the merged indexed data records;

discovers a new electronic data describing a new event in the computing system;

in response to discovering the new electronic data, indexes the new electronic data to create a new indexed data record;

merges the new indexed data record with the merged indexed data records; and stores the new indexed data record in the computer memory as part of the flat data structure.

10. The database management system of claim 8, wherein the microprocessor, when executing the one or more sets of instructions, further:

receives a database query that comprises a query term;

searches the flat data structure for a match between the query term and an n-gram stored in the flat data structure; and returns a document identifier associated with the match between the query term and the n-gram stored in the flat data structure.

11. The database management system of claim 10, wherein the database query comprises a string query, wherein the n-gram comprises a trigram, wherein the flat data structure is stored in a cloud-computing environment and wherein the microprocessor, when executing the one or more sets of instructions, further:

receives a second database query that comprises a second query term;

searches the flat data structure for a match between the second query term and another n-gram stored in the flat data structure, wherein the flat data structure is searched for the second query term in parallel with being searched for the query term; and returns a second document identifier associated with the match between the second query term and the another n-gram stored in the flat data structure.

12. The database management system of claim 8, wherein the flat data structure correlates n-grams to document identifiers, and wherein the n-grams are encoded as integer values.

13. The database management system of claim 8, wherein the electronic data comprises data files received from endpoints in the computing system, and wherein the flat data structure is searchable immediately after having the indexed data records stored therein.

14. A database management system, comprising:

a network interface to send and receive communications;

a microprocessor in communication with the network interface; and a computer readable medium coupled with the microprocessor and comprising one or more sets of instructions that, when executed by the microprocessor, cause the microprocessor to:

receive a database search query comprising a query term to search electronic data describing events that have occurred in a computing system;

convert the query term into an equivalent n-gram;

search indexed data records configured as a flat data structure for electronic data matching the equivalent n-gram; and provide search results to a user, wherein the search results comprise a set of document identifiers, each document identifier being associated with electronic data in a shard, the shard corresponding to a subset of the electronic data, and wherein document identifiers are unique to a shard corresponding to a subset of the electronic data but not globally unique, wherein the document identifiers are stored in a delta-compressed list storing a plurality of delta-compressed document identifier values, wherein each stored value of the document identifiers in the delta-compressed list represents a numerical difference between sequential document identifiers excluding a first document identifier and a last document identifier; and wherein the delta-compressed list is further compressed by storing differences between adjacent delta values.

15. The database management system of claim 14, wherein the microprocessor converts the equivalent n-gram into an equivalent set of integers and uses the equivalent set of integers in the search of the indexed data records.

16. The database management system of claim 14, wherein the query term comprises plural sets of characters corresponding to multiple n-grams, and wherein the matching electronic data provided to the user is a union of matching electronic data corresponding to the multiple n-grams.

17. The database management system of claim 14 wherein each document identifier has a corresponding byte offset of a record in the electronic data.

* * * * *